(12) United States Patent
Yasuda et al.

(10) Patent No.: US 6,966,616 B2
(45) Date of Patent: Nov. 22, 2005

(54) HYDRAULIC BRAKE APPARATUS FOR A VEHICLE

(75) Inventors: Atsushi Yasuda, Toyoake (JP); Yuji Goto, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/976,919

(22) Filed: Nov. 1, 2004

(65) Prior Publication Data
US 2005/0099062 A1 May 12, 2005

(30) Foreign Application Priority Data
Nov. 7, 2003 (JP) ............................. 2003-378214

(51) Int. Cl.[7] ............................................... B60T 8/44
(52) U.S. Cl. ...................... 303/114.1; 60/550; 60/582; 188/358
(58) Field of Search .................. 188/358, 359; 303/114.1, 114.3, 114.2, 113.1; 60/550, 552, 60/553, 581, 582

(56) References Cited

U.S. PATENT DOCUMENTS

| | | | |
|---|---|---|---|
| 6,477,839 B2 | 11/2002 | Nishii et al. | |
| 6,568,183 B2 | 5/2003 | Nishii et al. | |
| 6,655,513 B2 * | 12/2003 | Ishida et al. | 188/357 |
| 6,705,682 B2 * | 3/2004 | Kusano et al. | 303/114.1 |
| 6,789,857 B2 * | 9/2004 | Kusano | 303/114.1 |

FOREIGN PATENT DOCUMENTS

| | | |
|---|---|---|
| JP | 2001-334926 | 12/2001 |
| JP | 2002-53028 | 2/2002 |
| JP | 2002-154422 | 5/2002 |

* cited by examiner

Primary Examiner—Douglas C. Butler
(74) Attorney, Agent, or Firm—Burns, Doane, Swecker & Mathis LLP

(57) ABSTRACT

A hydraulic brake apparatus is provided with a master cylinder, an assisting device for assisting the master piston to be advanced in response to operation of a brake pedal, and an auxiliary piston having a large diameter portion and a small diameter portion to define first and second pressure transmitting chambers, with the large diameter portion connected to the assisting device. A first valve member is provided for controlling the communication between the first and second pressure transmitting chambers, and a second valve member is provided for controlling a flow of the brake fluid from the first chamber to the second chamber. A valve opening mechanism is provided for opening the first valve member, and mechanically connecting the second valve member with the first valve member, to open the second valve member when the auxiliary piston is retracted from its advanced state to its initial position.

6 Claims, 4 Drawing Sheets

HYDRAULIC BRAKE APPARATUS FOR A VEHICLE

This application claims priority under 35 U.S.C. Sec. 119 to No. 2003-378214 filed in Japan on Nov. 7, 2003, the entire content of which is herein incorporated by reference.

BACKGROUND OF THE INVENTION

1. Field of the invention

The present invention relates to a hydraulic brake apparatus for a vehicle, and more particularly to the hydraulic brake apparatus for assisting a master piston to be advanced, through an auxiliary piston by means of an assisting device.

2. Description of the Related Arts

As for hydraulic brake apparatuses, various types are known heretofore. Among them, in Japanese Patent Laid open Publication Nos.2001-334926, 2002-154422 and 2002-53028, there is proposed a hydraulic brake apparatus which is provided with a vacuum booster acting as assisting means or assisting device, and which is capable of obtaining an appropriate input-output property, even if it was failed, or after having exceeded its assisting limit. In each of the hydraulic brake apparatuses described in those Publications, there are provided a master cylinder for advancing a master piston in response to operation of a brake pedal to pressurize brake fluid in an atmospheric pressure reservoir and discharge the pressurized brake fluid, an assisting device for assisting the master piston to be advanced in response to operation of the brake pedal, and an auxiliary piston having a large diameter portion with an effective cross-sectional area larger than an effective cross-sectional area of the master piston and a small diameter portion with an effective cross-sectional area smaller than the effective cross-sectional area of the master piston, defining a first pressure transmitting chamber between the large diameter portion and the master piston, and defining a second pressure transmitting chamber between the small diameter portion and the master piston. A first valve member is provided for closing the first pressure transmitting chamber when the master piston is assisted by the assisting device through the auxiliary piston, and communicating the first pressure transmitting chamber with the atmospheric pressure reservoir, when the master piston is not assisted by the assisting device, and after the assisting device has exceeded its assisting limit. And, a second valve member is provided for normally allowing a flow of the brake fluid from the first pressure transmitting chamber to the second pressure transmitting chamber, and preventing a flow of the brake fluid from the second pressure transmitting chamber to the first pressure transmitting chamber to hold the hydraulic pressure in the second pressure transmitting chamber, and it is so constituted that the second valve member can be opened while the first valve member is being opened. According to the apparatuses as described in the Publication No. 2001-334926, the assisting piston is constituted by a single piston member, whereas the assisting piston is constituted by a couple of piston members according to the apparatuses as described in the Publication Nos. 2002-154422 and 2002-53028.

According to the apparatuses as described in those Publications, an appropriate input-output property can be obtained surely with a simple structure, after the assisting means exceeded its assisting limit, and when it was failed. According to the apparatus as described in the Publication No. 2002-154422, a master piston can be reduced in length along its longitudinal axis, and easily manufactured at a low cost. According to any of the hydraulic brake apparatuses, however, a pedal feeling can not necessarily be improved satisfactorily, it is so constituted that after the brake pedal is released, the second valve member is opened with the pressure in the first pressure (transmitting) chamber being reduced. Therefore, the pressure holding state in the second pressure (transmitting) chamber is canceled, whereby the auxiliary piston is immediately retracted to its initial position, or the small diameter portion of the piston is immediately retracted until it abuts on the large diameter portion of the piston in the Publication Nos. 2002-154422 and 2002-53028. In those hydraulic brake apparatuses, a valve opening mechanism including the second valve member is of a type responsive to the hydraulic pressure, so as to operate in response to variation of the hydraulic pressure, respectively, improvements in pedal feeling and simplicity in structure have been required.

SUMMARY OF THE INVENTION

Accordingly, it is an object of the present invention to provide a hydraulic brake apparatus for assisting a master piston to be advanced through an auxiliary piston by means of an assisting device, with a simple structure, to obtain an appropriate pedal feeling even in the case where a brake pedal is being released.

In accomplish the above and other objects, a hydraulic brake apparatus is provided for applying braking force to each wheel of a vehicle in response to depression of a brake pedal. The apparatus includes a master cylinder for advancing a master piston in response to operation of the brake pedal to pressurize brake fluid in an atmospheric pressure reservoir and discharge the pressurized brake fluid, an assisting device for assisting the master piston to be advanced in response to operation of the brake pedal, and an auxiliary piston having a large diameter portion with an effective cross-sectional area larger than an effective cross-sectional area of the master piston and a small diameter portion with an effective cross-sectional area smaller than the effective cross-sectional area of the master piston, defining a first pressure transmitting chamber between the large diameter portion and the master piston, and defining a second pressure transmitting chamber between the small diameter portion and the master piston. The auxiliary piston is arranged to connect the large diameter portion with the assisting device. A first valve member is provided for closing the first pressure transmitting chamber when the master piston is assisted by the assisting device through the auxiliary piston, and communicating the first pressure transmitting chamber with the atmospheric pressure reservoir when the master piston is not assisted by the assisting device, and after the assisting device has exceeded an assisting limit thereof. Also, a second valve member is provided for normally allowing a flow of the brake fluid from the first pressure transmitting chamber to the second pressure transmitting chamber, and preventing a flow of the brake fluid from the second pressure transmitting chamber to the first pressure transmitting chamber to hold the hydraulic pressure in the second pressure transmitting chamber. And, a valve opening mechanism is provided for opening the first valve member, and mechanically connecting the second valve member with the first valve member, to open the second valve member when the auxiliary piston is retracted from an advanced state thereof to an initial position of the auxiliary piston.

Preferably, the valve opening mechanism includes a rod member disposed between the first valve member and the second valve member, and an engaging member mounted on an output portion of the assisting device. The engaging member is arranged to push the first valve member to be opened, and push the second valve member through the first valve member and the rod member to open the second valve member, when the auxiliary piston is retracted to the initial position thereof.

The auxiliary piston may include a first piston, which has the large diameter portion with the effective cross-sectional area larger than the effective cross-sectional area of the master piston, and which is connected to the assisting device, and a second piston which has the small diameter portion with the effective cross-sectional area smaller than the effective cross-sectional area of the master piston.

Or, the auxiliary piston may be made of a single piston member having the large diameter portion and the small diameter portion.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
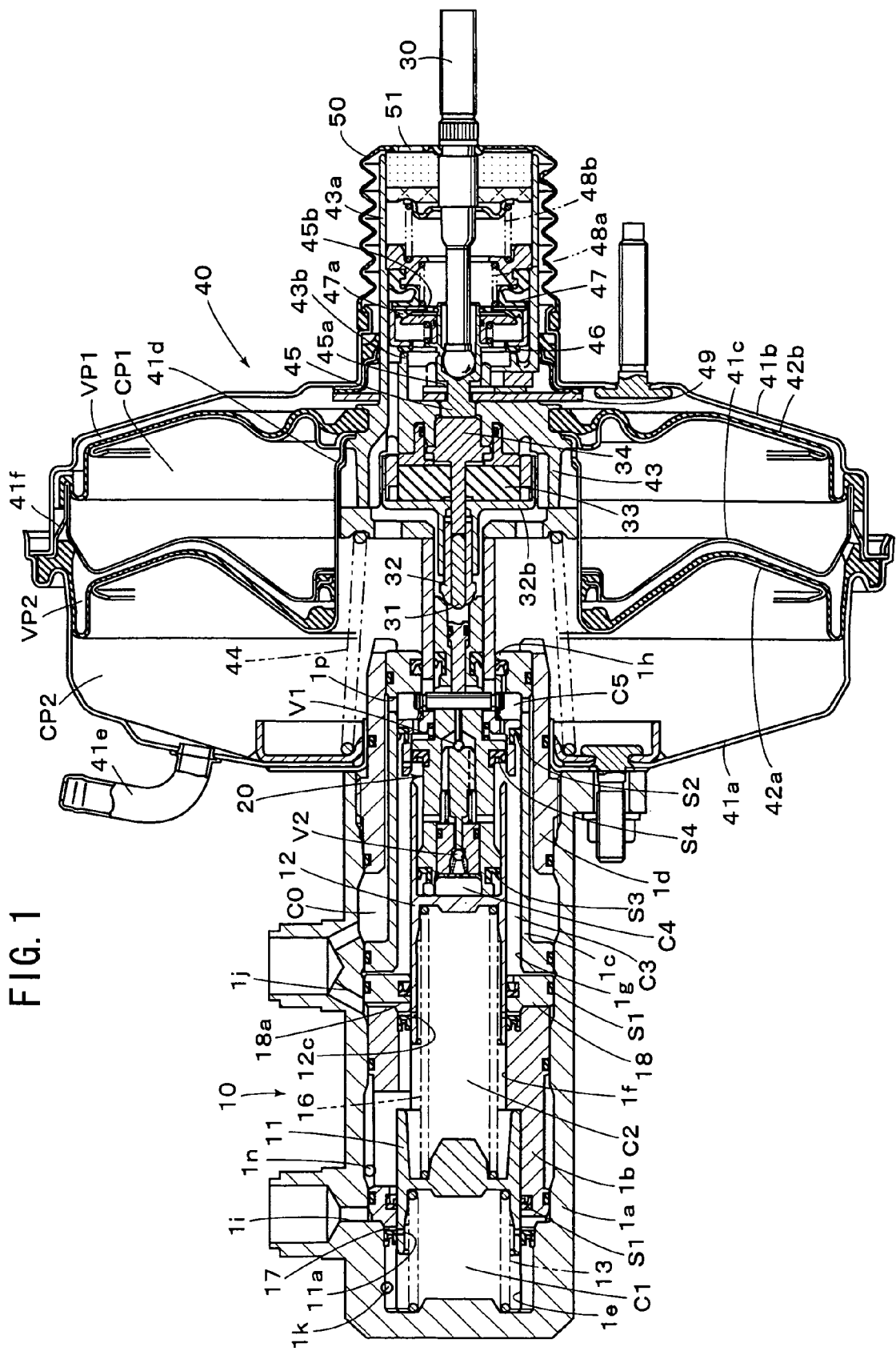
FIG. 1 is a sectional view of a hydraulic brake apparatus according to an embodiment of the present invention.

Referring to FIG. 1, there is illustrated a hydraulic brake apparatus for a vehicle according to an embodiment of the present invention, wherein depressed force applied to a brake pedal (not shown) is transmitted to an input rod 30 as braking force, with a vacuum booster 40 being served as an assisting device, to discharge from a master cylinder 10 a hydraulic braking pressure, which is supplied to a wheel brake cylinder (not shown) mounted on each wheel of the vehicle.

As shown in FIG. 1, master pistons 11 and 12, and an auxiliary piston 20 are accommodated in a cylinder body formed with cylinders 1a–1d, to provide a master cylinder 10. In the cylinder 1b, a stepped bore is formed with cylinder bores 1e and 1f having different inner diameters. Between the cylinders 1c and 1d, an annular atmospheric pressure chamber C0 is defined to communicate with an atmospheric reservoir (not shown). The cylinder 1c is formed with a cylinder bore 1g having an inner diameter larger than the inner diameters of the cylinder bores 1e and 1f, and formed at its side wall with a port 1p to be communicated with the atmospheric pressure chamber C0. At the bottom of the cylinder 1d, a hole 1h having a smaller diameter than the cylinder bore 1f. In the cylinder bore 1a, there are formed with supply ports 1i and 1j, and output ports 1k and 1n. At the front end of the cylinder 1b in the cylinder 1a, a communication hole 17 is defined radially, and annular cup-like seal members (indicated by S1) are disposed at opposite sides of the communication hole 17, through which a master pressure chamber C1 can be communicated with the supply port 1i. Between the cylinders 1b and 1c, there is disposed an annular member 18 with a communication hole 1 defined radially, and the seal members S1 are disposed at opposite sides of the communication hole 18a, through which a master pressure chamber C2 can be communicated with the supply port 1j.

Figure 2:
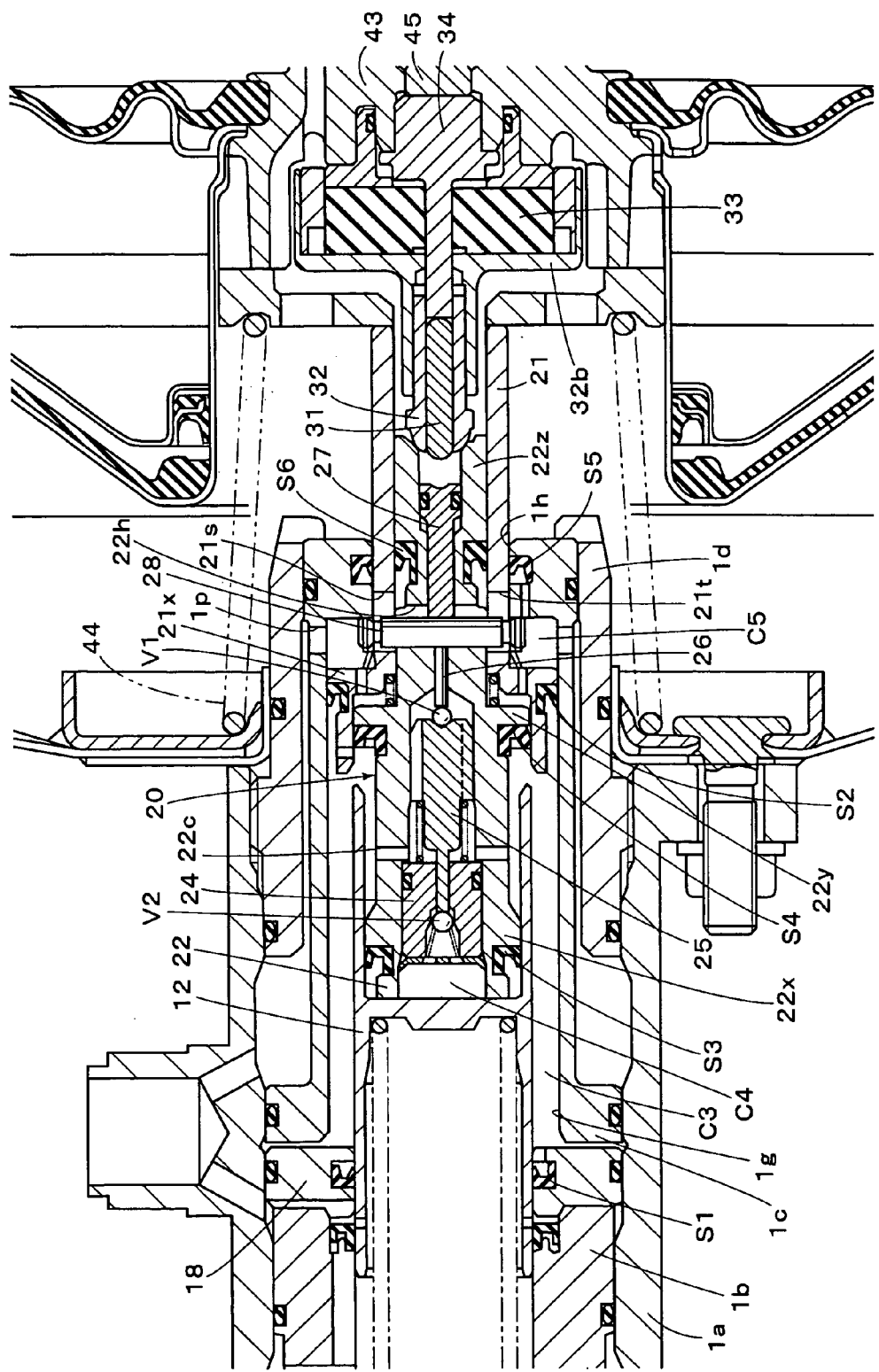
FIG. 2 is an enlarged sectional view of a potion of a hydraulic brake apparatus according to an embodiment of the present invention.

The master piston 11 of a cylindrical member with a bottom is accommodated in the cylinder bore 1e, so that the master pressure chamber C1 is defined between the cylinder 1a and the master piston 11. Also, the master piston 12 is accommodated in the cylinder bore 1f, so that the master pressure chamber C2 is defined between the master pistons 11 and 12. The rear end of the master piston 11 is prevented from being moved rearward at a stepped portion between the cylinders 1e and 1f, so that a communication hole 11a defined on its skirt portion faces with the communication hole 17 to communicate the master pressure chamber C1 with the atmospheric reservoir (not shown) through the supply port 1i at the rear end of the master piston 11 placed in its original position before moving. The output port 1k is communicated with the master pressure chamber C1, and the output port 1n is communicated with the master pressure chamber C2. A return spring 13 is disposed between the tip end surface in the cylinder 1a and the bottom surface of the recessed portion of the master piston 11, to urge the master piston 11 rearward. The master piston 12 is formed at opposite ends thereof with hollow portions divided by a partition wall at approximately the center of them. The master piston 12 is urged by a return spring 16, so that its rear end surface abuts on the front end surface of the auxiliary piston 20 (piston member 22 as shown in FIG. 2) when the master piston 12 is placed in its original position before moving. Thus, the rear end position of the master piston 12 is defined in a relative relationship with the auxiliary piston 20, so that a communication hole 12c defined on the master piston 12 faces with the communication hole 18 of the annular member 18a to communicate the master pressure chamber C2 with the atmospheric reservoir (not shown) through the supply port 1j at the rear end of the master piston 12 placed in its original position before being advanced.

According to the present embodiment, the auxiliary piston 20 is assembled by the piston members 21 and 22 to form a stepped cylinder as shown in FIG.2. The piston member 21 is formed to provide a stepped hollow portion, with a lager diameter hollow portion formed to be equal to the outer diameter of the master piston 12, and with a cup-like seal member S2 disposed around the outer periphery of the large diameter portion 21x, so that the piston member 21 is fluid-tightly and slidably received in the cylinder bore 1g. The piston member 22 has a small diameter portion 22x with its effective cross-sectional area being smaller than an effective cross-sectional area of the master piston 12, a large diameter portion 22y with its effective cross-sectional area being approximately equal to the effective cross-sectional area of the master piston 12, and a small diameter extending portion 22z extending rearward. The front small diameter portion 22x is fluid-tightly and slidably supported in the hollow portion of the master piston 12 through a cup-like seal member 53, whereas the large diameter portion 22y is fluid-tightly and slidably supported in the large diameter hollow portion of the piston member 21 through a cup-like seal member 54. The rear extending portion 22z is fluid-tightly and slidably received in the small diameter hollow portion of the piston member 21 through a cup-like seal member 56, and a columnar plunger 27 is fluid-tightly and slidably received in the hollow portion of the extending portion 22z. Consequently, a first pressure transmitting chamber C3 is defined between the seal member S1 and the seal members S2 and S4 within the cylinder bore 1g between the inner surface thereof and the outer surfaces of the master piston 12 and piston member 22, and an atmospheric pressure chamber C5 is defined rearward of the piston member 21, within the cylinder bore 1g. Therefore, a second pressure transmitting chamber C4 is defined between the inner surface of the master piston 12 and the inner diameter 22x (seal member 53), as will be described later in detail.

The small diameter hollow portion of the piston member 21 is fluid-tightly and slidably supported in the hole 1h of the cylinder 1c through a cup-like seal member S5. At the side surface of the piston member 21, elongated holes 21s and 21t with their longer axes positioned along the axis of the piston member 21 are formed on the upper and lower sections in FIG. 2 to communicate with the atmospheric pressure chamber C5. And, a through hole 22h is formed on the extending portion 22z of the piston member 22. A pin 28 is disposed through the through hole 22h, and elongated holes 21s and 21t, so that the plunger 27 is supported to be movable by a predetermined distance along the longitudinal axis against the through hole 22h, and elongated holes 21s and 21t. In the small diameter hollow portion of the piston member 21, there are disposed a first transmitting member 31 for transmitting the amount of operation of the brake pedal (not shown), and a second transmitting member 32 for transmitting through a reaction force rubber disc 33 the assisting force produced by the vacuum booster 40 (described later) in response to operation of the brake pedal. The first transmitting member 31 is constituted by a rod, whose front end is arranged to be capable of abutting on the rear end of the plunger 27, and whose rear end is arranged to be capable of abutting on the tip end of a transmitting member 34 which extends through the reaction force rubber disc 33. The second transmitting member 32 is formed into a cylinder, in a hollow portion of which the first transmitting member 31 and the tip end portion of the transmitting member 34 are accommodated. The second transmitting member 32 is arranged, with its front end abutting on the piston member 22, and with its body portion 32b being supported by a power piston 43 through the reaction force rubber disc 33. Therefore, the piston member 22 constituting the auxiliary piston 20 is connected to the second transmitting member 32 through an extending portion 22z of the piston member 22, whereas the plunger 27 is connected to a transmitting piston 34 through the first transmitting member 31.

Figure 3:
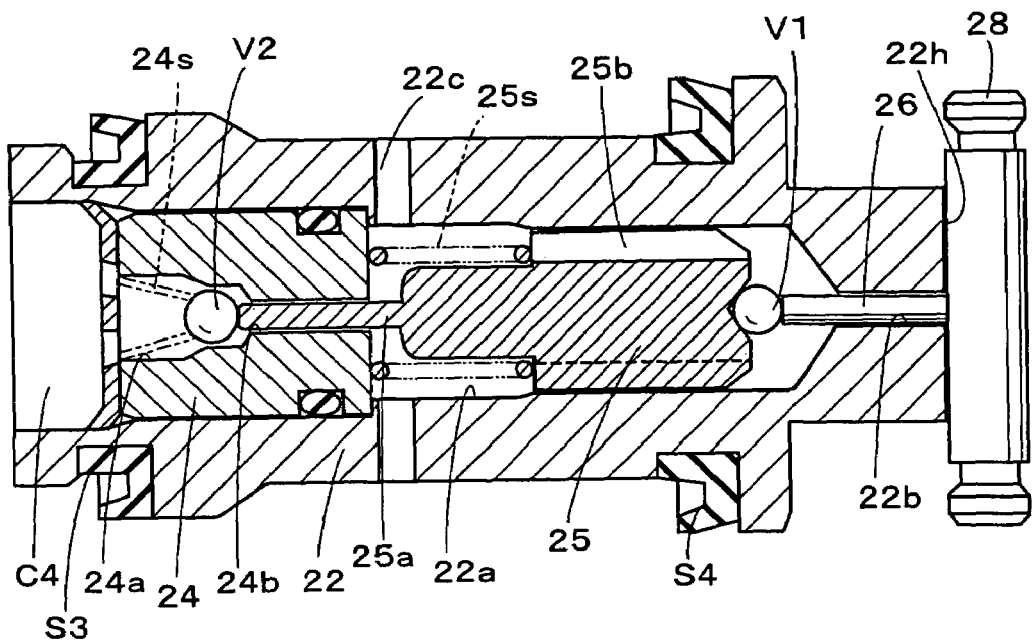
FIG. 3 is a sectional view of a valve opening mechanism in motion according to an embodiment of the present invention.

Then, with the auxiliary piston 20, there are disposed the first valve member, second valve member and valve opening mechanism according to the present invention, as shown in FIGS. 2 and 3. The piston member 22 is formed at its front end with stepped recess 22a, and at its rear end bottom a communication hole 22b opening into the through hole 22h, to provide a valve seat for a valve member V1. A pin 26 is slidably received in the communication hole 22b to provide a clearance between them for passing the brake fluid. The pin 26 is arranged, with its front end abutting on the valve member V1, and with its rear end abutting on the outer side surface of the pin 28. The valve member V1 may be secured to the front end of the pin 26. Then, it is so arranged that a rod 25 having a pin 25a at its front end is received in the stepped recess 22a, to abut on the spherical valve member V1 at its rear end. The rod 25 is biased by a spring 25s to urge the valve member V1 toward the communication hole 22b. As shown in FIG. 3, the rod 25 is formed with a longitudinal groove 25b for the communication. The valve member V1 may be secured to the rear end of the rod 25. Furthermore, in the stepped recess 22a, there are disposed a valve seat member 24, spherical valve member V2 and a spring 24s. The valve member V2 is biased by the spring 24s to urge the valve member V2 toward a communication hole 24b, which constitutes a valve seat for the valve member V2. With the valve member V2 and spring 24s, the second valve member having a check valve function is constituted. Then, the large diameter portion of the stepped recess 22a formed at the front end thereof constitutes as an opening portion for communicating with the second pressure transmitting chamber C4.

Figure 4:
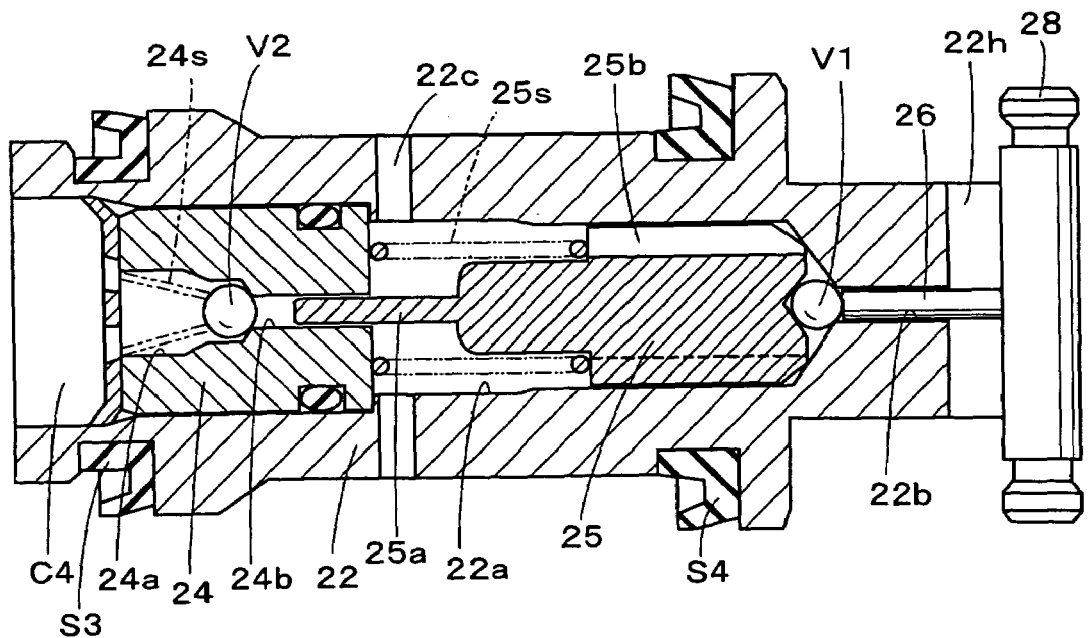
FIG. 4 is a sectional view of a valve opening mechanism in motion according to an embodiment of the present invention.
Figure 5:
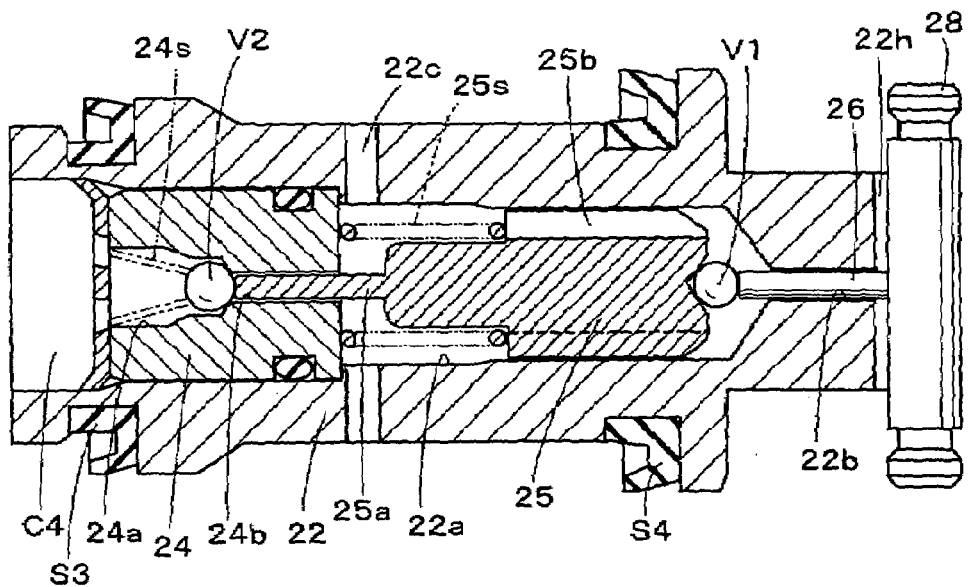
FIG. 5 is a sectional view of a valve opening mechanism in motion according to an embodiment of the present invention.

According to the first and second valve members, and the valve opening mechanism as constituted above, in the state where the braking operation has not been made as shown in FIGS. 1–3, the first and second pressure transmitting chambers 03 and 04 are communicated with the atmospheric pressure chamber CO through the communication holes 22c and 22b, through hole 22h, elongated holes 21s and 21t, and port 1p. When the brake pedal is depressed, the auxiliary piston 20 is advanced with the vacuum booster 40 actuated, while the plunger 27 and pin 28 are moved rearward relatively. When the valve member V1 is seated on the communication hole 22b with the biasing force of the spring 25s applied to the valve member V1, as shown in FIG.4, the communication between the atmospheric pressure chamber C0 and the first and second pressure transmitting chambers C3 and C4 is blocked. In the state where the valve member V1 is seated on the communication hole 22b, the first and second pressure transmitting chambers C3 and C4 are filled with brake fluid to provide a closed space, thereby to fluidly combine the master piston 12 and the auxiliary piston 20 to provide a so-called hydraulic pressure locking. In this case, since the effective cross-sectional area of the piston member 21 constituting the auxiliary piston 20 is larger than the effective cross-sectional area of the master piston 12, the master piston 12 will be advanced with the piston member 21 being advanced, to expand the second pressure transmitting chamber C4. Therefore, the master piston 12 and the auxiliary piston 20 will be moved in a body, in the state with the second pressure transmitting chamber C4 expanded.

When the brake pedal (not shown) is depressed further to exceed the assisting limit of the vacuum booster 40, the first transmitting member 31 in FIG. 2 is advanced, with its front end surface contacting the rear end surface of the plunger 27. As a result, the valve member V1 is unseated from the communication hole 22b, so that the first pressure transmitting chamber C3 is communicated with the atmospheric pressure chamber C0 through the through hole 22h, elongated holes 21s and 21t, and port 1p (in FIG. 2), whereby the pressure in the first pressure transmitting chamber C3 is reduced. Consequently, the plunger 27 is mechanically connected to the pin 28, then to the pin 26, and further to the piston member 22, the pressing force applied to the plunger 27 is transmitted to the valve member V2, through the pin 28, pin 26, valve member V1 and rod 25. In this case, as the pressure in the second pressure transmitting chamber C4 is larger than the pressure in the pressure transmitting chamber C3, the valve member V2 will be held to be seated on the communication hole 22b, to hold the second pressure transmitting chamber C4 with the closed space.

On the contrary, provided that the apparatus is failed, for example, when the brake pedal is depressed, with the auxiliary piston 20 being stopped, and the plunger 27 is advanced relative to the piston member 22, then the plunger 27 will abut on the pin 28. When the plunger 27 is advanced further, the valve member V1 is advanced through the pins 28 and 26, so that the valve member V1 is unseated from the communication hole 22b, and at the same time the valve member V2 is advanced through the rod 25, so that the valve member V2 is unseated from the communication hole 24b. Consequently, the plunger 27 is mechanically connected to the pin 28, then to the piston member 22, and further to the master piston 12, the pressing force applied to the plunger 27 is transmitted to the master piston 12 as it is, through the pin 28 and piston member 22.

Next, with respect to the vacuum booster 40, shell-like housings 41a and 41b are connected with each other through a fixed wall 41c and movable walls 42a and 42b, constant pressure chambers (vacuum chambers) CP1 and CP2 are defined in front of the movable walls 42a and 42b, respectively, and variable pressure chambers VP1 and VP2 are defined rearward of the movable walls 42a and 42b, respectively. The constant pressure chambers CP1 and CP2 are communicated with each other through a communication hole 41d, and communicated with a negative pressure source such as an intake manifold (not shown) or the like through an inlet 41e, to maintain the negative pressure. Also, the variable pressure chambers VP1 and VP2 are communicated with each other through a communication hole 41f. Each of the movable walls 42a and 42b is formed with a pressure receiving plate and a diaphragm, on the center of which one open end of a cylindrical power piston 43 is fixed air-tightly, with the other one open end of the power piston 43 extending rearward through the housing 41b to form a cylindrical portion 43a. The power piston 43 is slidably supported in the opening portion of the housing 41b, and covered by a boot 50, which is fixed to the input rod 30 and formed with a communication hole 51 near the open end of the power piston 43. A spring 44 is disposed between the front end portion of the power piston 43 and the inner surface of the front housing 41a, to urge the movable walls 42a and 42b toward the rear housing 41b.

The input rod 30 is arranged to be placed along the central axis in the power piston 43, and connected at its tip end with a plunger 45 through a ball bearing. The plunger 45 is slidably supported in a longitudinal through hole defined in the power piston 43, with a valve seat 43b formed around the through hole. Surrounding the valve seat 43b and abutting thereon, an annular valve member 46a is urged to form a first control valve mechanism 46 within the power piston 43. The plunger 45 is formed at its rear end portion with a valve seat 45b, and an annular valve member 47a is urged to abut on the valve seat 45b, whereby a second control valve mechanism 47 is formed to be called as an air valve. The second control valve mechanism 47 is provided with a valve member 47a, which is formed in front of the front end of a cylindrical resilient member, and urged toward the valve seat 43b by a spring 48a mounted on its rear end. The resilient member constituting the second control valve mechanism 47 is urged at its rear end toward the valve seat 43b, so that it is engaged with a step formed inside of the cylindrical portion 43a, by the biasing force of the resilient member. An annular reduced diameter portion 45a is formed rearward of the sliding portion, which is formed on the tip end of the plunger 45. Against the reduced diameter portion 45a, a key member 49 is fitted to be movable along the longitudinal axis by a predetermined distance. The key member 49 extends from the outer periphery of the power piston 43, and engages with the housing 41b to restrain the plunger 45 from being moved rearward along the longitudinal axis, whereby the retracted position of the movable walls 42a and 42b is defined. The power piston 43 is formed at its front end surface with a recess, into which the rear end portion 32b of the second transmitting member 32 is fitted, with the reaction force rubber disc 33 served as a reaction force resilient member being disposed. A transmitting piston 34 abutting on the rear end of the first transmitting member 31 is arranged to penetrate the reaction force rubber disc 33 and abut at its rear end on the front end surface of the plunger 45, and supported to be movable along the longitudinal axis.

Accordingly, when the brake apparatus is assisted by the vacuum booster 40, so that the pressing force applied to the movable walls 42a and 42b reaches the predetermined value, with the pressure in the variable pressure chambers VP1 and VP2 being increased, the reaction force rubber disc 33 expands rearward at its part facing the transmitting piston 34, to contact the tip end surface of the transmitting piston 34. Therefore, the rearward reaction force is applied to the plunger 45 in proportion to the pressing fore applied to the movable walls 42a and 42b. As a result, the first control valve mechanism 46 and second control valve mechanism 47 are controlled in response to the difference between the reaction force and the operational force applied to the input rod 30. As the operation of the vacuum booster 40 and the basic operation of the master cylinder 10 assisted thereby are substantially the same as those described in the aforementioned prior publications, the detailed explanation is omitted herein.

Hereinafter, will be explained operation of the hydraulic brake apparatus of the present embodiment as constituted above, especially about its valve opening mechanism. As shown in FIGS. 1 and 2, in the normal braking operation, when the brake pedal (not shown) is depressed, the piston member 22 of the auxiliary piston 20 is advanced, the valve member V1 of the first valve member is closed to increase the pressure in the first pressure transmitting chamber C3. At the same time, the valve member V2 of the second valve member is closed in response to the brake pedal stroke, whereby the second pressure transmitting chamber C4 is held in its closed state, to provide a so-called hydraulic pressure locking chamber. Then, the master piston 12 is advanced (leftward in FIGS. 1 and 2) relatively to the piston member 21, so that the second pressure transmitting chamber C4 is enlarged, due to a difference in effective cross-sectional area (difference in diameter of cylinder) between the master piston 12 and the front large diameter portion 21x of the piston member 21. In this case, the closed valve member V2 allows only the supply of brake fluid from the first pressure transmitting chamber C3 to the second pressure transmitting chamber C4, while the reverse flow is prohibited, according to its check valve function, so that the brake fluid is supplied from the first pressure transmitting chamber C3 to the second pressure transmitting chamber C4 in response to the relative movement of the piston member 21.

When the vacuum booster 40 reaches its assisting limit, the relative displacement is caused in the second control valve mechanism 47 (air valve) to open the valve member V1, i.e., the first member, so that the first pressure transmitting chamber C3 is communicated with the atmospheric pressure chamber C0, thereby to cancel the closed state. In this case, as the second pressure transmitting chamber C4 has been held to be in the closed state, even if the closed state in the first pressure transmitting chamber C3 was canceled, the master piston 12 would not be moved backward, but moved after the assisting limit, together with the piston member 22 of the auxiliary piston 20, which has been connected with the master piston 12 in a body through a hydraulic pressure locking. Consequently, the master piston 12 having a small effective cross-sectional area is actuated to increase the hydraulic pressure.

When the brake pedal (not shown) is released, the auxiliary piston 20 is moved backward, with the second pressure transmitting chamber C4 being closed. When the auxiliary piston 20 is retracted to its initial position, the valve member V1 is pushed by the pins 28 and 26, to be unseated from the communication hole 22b to open the valve member V1. Then, the valve member V2 is pushed by the pins 28 and 26 and the rod 25, to be unseated from the communication hole 24b to open the valve member V2, whereby the closed state in the second pressure transmitting chamber C4 is canceled mechanically. According to the present embodiment, therefore, the closed state in the second pressure transmitting chamber C4 will not be canceled while the brake pedal is being released, but it will be canceled according to the mechanical operation performed when the auxiliary piston 20 is retracted to its initial position. Therefore, a smooth braking operation can be achieved, without deteriorating the brake pedal feeling. In addition, as the mechanism for opening the valve members V1 and V2 can be simplified comparing with the prior apparatuses, the present apparatus can be reduced in cost.

Figure 6:
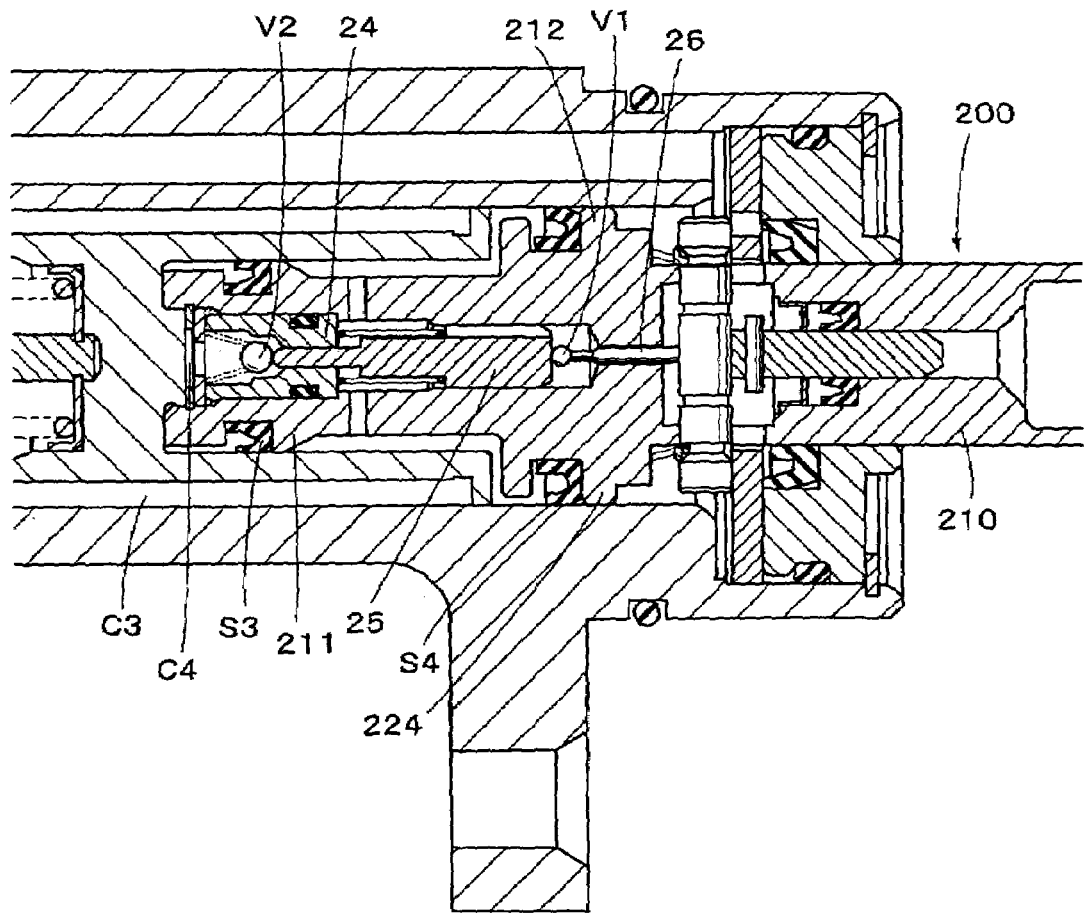
FIG. 6 is an enlarged sectional view of a potion of a hydraulic brake apparatus according to another embodiment of the present invention.

FIG. 6 shows a section including the auxiliary piston in the hydraulic brake apparatus according to another embodiment of the present invention, wherein same reference numerals denote substantially the same elements. According to the auxiliary piston 20 as shown in FIGS. 1 and 2, it includes two elements of the piston member 21 having the large diameter portion 21x and the piston member 22 having the small diameter portion, whereas according to the auxiliary piston 200 of the present embodiment, it is made of a single piston member 210 including a small diameter portion 211 and a large diameter portion 212. Consequently, while the input-output characteristic of this embodiment is different from that of the aforementioned embodiment, the structure of this embodiment may be simplified more than that of the former. With respect to the piston member 210, the rear portion of the large diameter portion 212 may be divided into two parts, wherein the structure is still simple, comparing with that of the aforementioned embodiment.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic brake apparatus for applying braking force to each wheel of a vehicle in response to depression of a brake pedal, comprising:
    a master cylinder for advancing a master piston in response to operation of said brake pedal to pressurize brake fluid in an atmospheric pressure reservoir and discharge the pressurized brake fluid;
    an assisting device for assisting said master piston to be advanced in response to operation of said brake pedal;
    an auxiliary piston having a large diameter portion with an effective cross-sectional area larger than an effective cross-sectional area of said master piston and a small diameter portion with an effective cross-sectional area smaller than the effective cross-sectional area of said master piston, defining a first pressure transmitting chamber between said large diameter portion and said master piston, and defining a second pressure transmitting chamber between said small diameter portion and said master piston, said auxiliary piston connecting said large diameter portion with said assisting device;
    a first valve member for closing said first pressure transmitting chamber when said master piston is assisted by said assisting device through said auxiliary piston, and communicating said first pressure transmitting chamber with said atmospheric pressure reservoir, when said master piston is not assisted by said assisting device, and after said assisting device has exceeded an assisting limit thereof;
    a second valve member for normally allowing a flow of the brake fluid from said first pressure transmitting chamber to said second pressure transmitting chamber, and preventing a flow of the brake fluid from said second pressure transmitting chamber to said first pressure transmitting chamber to hold the hydraulic pressure in said second pressure transmitting chamber; and
    a valve opening mechanism for opening said first valve member, and mechanically connecting said second valve member with said first valve member, to open said second valve member when said auxiliary piston is retracted from an advanced state thereof to an initial position of said auxiliary piston.

2. A hydraulic brake apparatus as set forth in claim 1, wherein said auxiliary piston includes,
    a first piston having the large diameter portion with the effective cross-sectional area of larger than the effective cross-sectional area of said master piston, said first piston being connected to said assisting device; and
    a second piston having the small diameter portion with the effective cross-sectional area smaller than the effective cross-sectional area of said master piston.

3. A hydraulic brake apparatus as set forth in claim 1, wherein said auxiliary piston is made of a single piston member having said large diameter portion and said small diameter portion.

4. A hydraulic brake apparatus as set forth in claim 1, wherein said valve opening mechanism includes,
    a rod member disposed between said first valve member and said second valve member; and
    an engaging member mounted on an output portion of said assisting device, said engaging member pushing said first valve member to be opened, and pushing said second valve member through said first valve member and said rod member to open said second valve member, when said auxiliary piston is retracted to the initial position thereof.

5. A hydraulic brake apparatus as set forth in claim 4, wherein said auxiliary piston includes,
    a first piston having the large diameter portion with the effective cross-sectional area larger than the effective cross-sectional area of said master piston, said first piston being connected to said assisting device; and
    a second piston having the small diameter portion with the effective cross-sectional area smaller than the effective cross-sectional area of said master piston.

6. A hydraulic brake apparatus as set forth in claim 4, wherein said auxiliary piston is made of a single piston member having said large diameter portion and said small diameter portion.

* * * * *